July 7, 1959 L. R. PEASLEE ET AL 2,894,253
SELSYN EXCITER FOR POSITION PROGRAMMING CONTROL SYSTEM
Filed Dec. 10, 1956 4 Sheets-Sheet 1
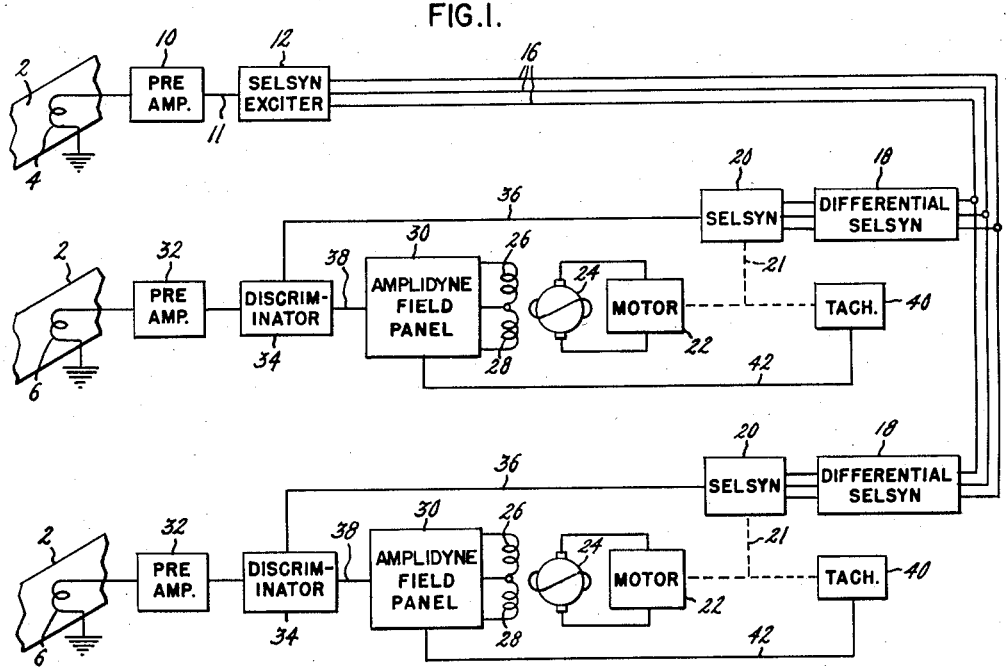
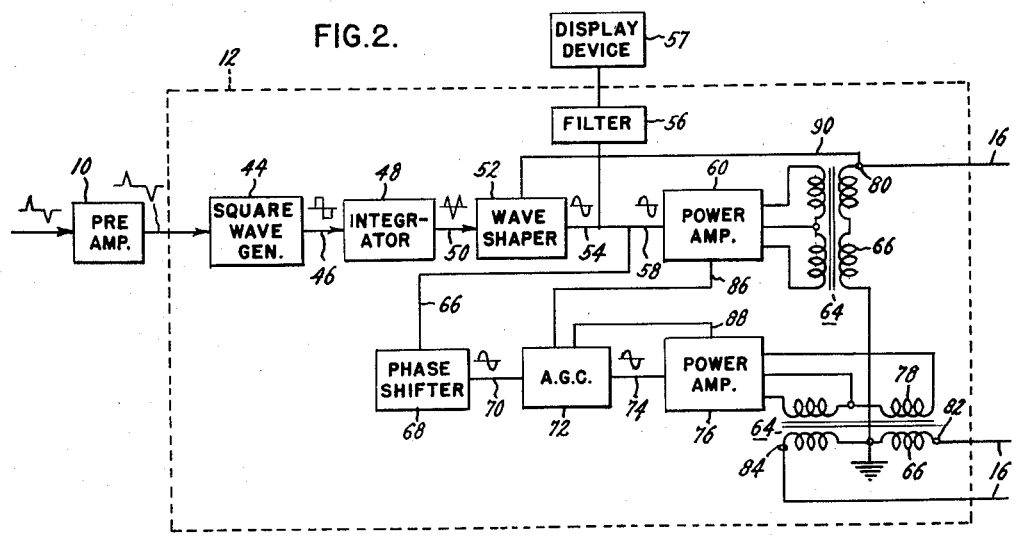
INVENTORS:
LAWRENCE R. PEASLEE,
MURRAY ROSENBLATT,
BY *Melvin M. Goldenberg*
THEIR ATTORNEY.

July 7, 1959

L. R. PEASLEE ET AL 2,894,253

SELSYN EXCITER FOR POSITION PROGRAMMING CONTROL SYSTEM

Filed Dec. 10, 1956

INVENTORS:
LAWRENCE R. PEASLEE,
MURRAY ROSENBLATT,

BY *Melvin M. Goldenberg*

THEIR ATTORNEY.

July 7, 1959  L. R. PEASLEE ET AL  2,894,253
SELSYN EXCITER FOR POSITION PROGRAMMING CONTROL SYSTEM
Filed Dec. 10, 1956  4 Sheets-Sheet 3

INVENTORS:
LAWRENCE R. PEASLEE,
MURRAY ROSENBLATT,
BY *Melvin M. Goldenberg*
THEIR ATTORNEY.

July 7, 1959 L. R. PEASLEE ET AL 2,894,253
SELSYN EXCITER FOR POSITION PROGRAMMING CONTROL SYSTEM
Filed Dec. 10, 1956 4 Sheets-Sheet 4

INVENTORS:
LAWRENCE R. PEASLEE,
MURRAY ROSENBLATT,
BY *Melvin M. Goldenberg*
THEIR ATTORNEY.

2,894,253
Patented July 7, 1959

2,894,253
SELSYN EXCITER FOR POSITION PROGRAMMING CONTROL SYSTEM

Lawrence R. Peaslee and Murray Rosenblatt, Waynesboro, Va., assignors to General Electric Company, a corporation of New York Application December 10, 1956, Serial No. 627,492

4 Claims. (Cl. 340—345)

This invention is related to improvements in means for producing electrical signals for use in program control systems wherein the motions of a device are carried out in response to information stored in a data storage device.

Systems of this character are disclosed in the patent to Livingston Patent Number 2,537,770 and in the co-pending applications of L. R. Peaslee, Serial Number 555,967, filed December 28, 1955, and Serial Number 627,311, filed December 10, 1958, both assigned to the same assignee as this application.

It is an object of this invention to provide an improved means for developing alternating electrical signals for exciting position indicating devices and which have a predetermined phase relationship and which are essentially free from undesirable harmonics and which may take the form of substantially sinusoidal waves.

It is still another object of this invention to provide an improved means for developing reference signals from pulses derived from a reference pattern stored in data storage medium which is relatively insensitive to changes in frequency of the reference signals occasioned either by virtue of recording a variable frequency or by changes in the speed of a data storage transport mechanism.

It is another object of this invention to provide an improved means for developing reference electrical signals from a reference pattern stored in a data storage medium which reference signals bear a predetermined phase and amplitude relationship to each other and from which undesirable harmonics have been removed.

As explained in the patent and co-pending applications referred to above, a selsyn exciter is provided to supply the inputs of position indicating selsyns. This supply may take the form of either two or three-phase alternating signals having a constant phase and amplitude relationship to each other. In order to provide for greater accuracy in the system by developing true sinusoidal control signals by the selsyn exciter from the reference pattern, we propose to remove from such control signals undesirable harmonic variations and to insure that the proper phase and amplitude relationships are maintained.

Briefly in one form of our invention we provide a means for deriving reference signals from a data storage device. Means responsive to the reference signals develop square waves which are coupled to an integrating device. After integration, a wave shaper develops substantially sinusoidal signals and one output of the wave shaper is coupled to a first power amplifier. The portion of the output of the wave shaper is coupled through a phase-shifting network and automatic gain control circuit to a second power amplifier whereby the output of the system at this point is at least two sinusoidal alternating electrical signals bearing a constant phase relationship to each other. Included in the system are means for correcting the input to the wave shaper in order that a true sinusoidal output may be derived. Also included are adjustable filter means for eliminating undesirable harmonics.

The subject matter which we regard as our invention is particularly pointed out and distinctly claimed in the concluding portion of this specification. Our invention, however, both as to its organization and method of operation together with further objects and advantages thereof, may best be understood by reference to the following description taken in connection with the accompanying drawings in which:

Fig. 1 is a schematic block diagram of an embodiment of the invention incorporated in a programming control system;

Fig. 2 is a schematic block diagram of an improved control signal developing means embodying our invention;

Figure 3:
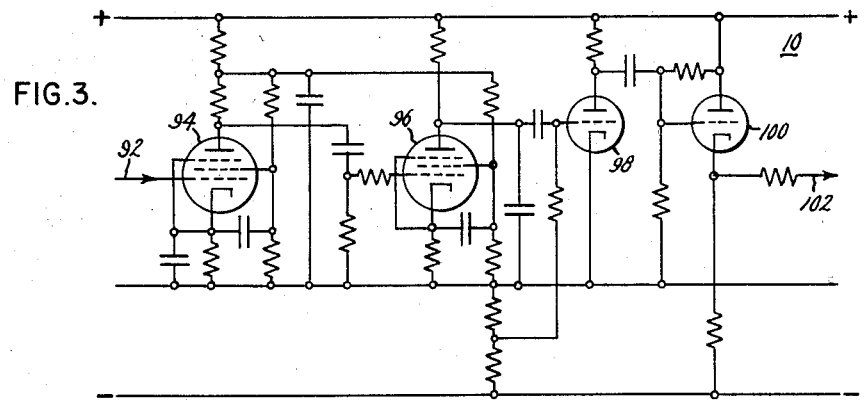
Fig. 3 is a schematic diagram of an amplifier usable with our invention.

In Fig. 1 of the drawing, we show a programming control system similar to that disclosed in the co-pending applications of Peaslee referred to above. Since this system is described in detail in those co-pending applications, we will only briefly describe its operation here. A data storage device such as a magnetic tape 2 is provided which in the illustration is shown as portions of three separate tapes but in actuality may be constituted by a single tape having a plurality of channels including a reference channel and one or more control channels recorded thereon. Pick-up heads or other sensing devices 4 and 6 are provided to derive the reference signals and the control signals for a reference and as many control channels as desired from the storage device. In the case of the reference channel, a preamplifier 10 initially amplifies the signals derived from the storage medium. The nature of these signals is described in the co-pending applications referred to and may take any number of forms. After amplification by the preamplifier 10, a selsyn exciter 12 develops an output of at least two phases from the control signals. It should be understood that, if desired, the arrangement disclosed hereinafter may also have an application wherein it is desired to produce a single alternating sinusoidal signal from reference signals or pulses. As is illustrated in the drawing in this application, an output of three phases is derived via the conductors 16. The conductors 16 supply the input to a differential selsyn 18 which in turn is coupled to a position indicating selsyn 20. Position indicating selsyn 20 may be mechanically coupled as indicated by a dotted line 21 to a positioning motor 22 which may be coupled to the table or head of a machine tool being programmed by a system incorporating our invention. Alternatively, the selsyn 20 may be coupled directly to the table or head of such a machine tool. A motor control unit such as an amplidyne 24 or other power amplifier furnishes a motor control signal the direction and magnitude of which, in the case of an amplidyne, is determined by forward and reverse windings 26 and 28 respectively, provided on an amplidyne field panel 30.

Control signals having predetermined phase relationships with reference signals as determined during the recording of the program are derived from the pick-up head 6 and amplified by a suitable preamplifier 32. A phase comparator or discriminator 34 receives the amplified control signals and a signal from the selsyn 20, which selsyn signal has a phase relationship with the reference signals indicative of the true position or motion of the object being controlled. The position signal is coupled via a conductor 36 to the discriminator 34. The discriminator develops an error signal which is related to a departure of the phase relationship of the selsyn 20 to the reference signals from the predetermined relationship of the control signals to the reference signal and couples it via a conductor 38 to the amplidyne field panel 30. A tachometer 40 is mechanically connected to the positioning motor 22 and furnishes a velocity stabilizing signal via a conductor 42 to the amplidyne field panel 30.

In order to derive the suitable input signals for the position indicating selsyns, the selsyn exciter receives a reference signal which may take the forms of pulses, sine waves, square waves or other forms of signals and are derived from the reference channel in the data storage medium and develops therefrom substantially sinusoidal alternating electrical signals having a predetermined phase and amplitude relationship to each other and to the reference signal and supplies them to the selsyns.

Figure 9:
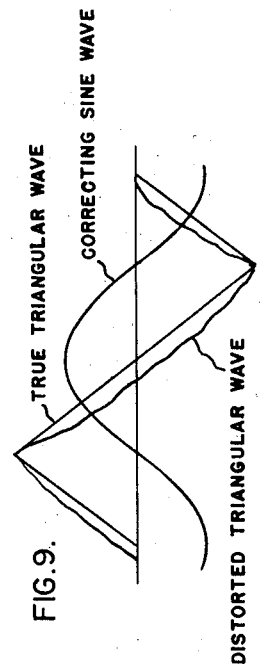
Fig. 9 is a plot of amplitude vs. time of waves produced by components of our invention.

In Fig. 2 we show schematically in a block diagram illustration means whereby this result is obtained. The selsyn exciter 12 in this figure is constituted in part by a square-wave generator 44 which receives the amplified reference signal from the preamplifier 10. The output of the square-wave generator 44 is coupled via a conductor 46 to an integrator 48 which develops a triangular wave therefrom and supplies it via a conductor 50 to a wave shaper 52. The wave shaper 52 forms the integrated square wave or triangular wave into a substantially sinusoidal wave and provides an output over a conductor 54. A filter network 56 is coupled to the conductor and will be described in greater detail hereinafter, but briefly it serves to pass only the harmonics from the output of the wave shaper 52 so that they can be examined on a display device 57 which may take the form of a cathode ray oscilloscope. A portion of the output of the wave shaper 52 is supplied via conductor 58 to a first power amplifier 60 which feeds a primary 62 of a Scott-connected T transformer 64 which has a secondary 66. Another portion of the output of the wave shaper 52 is supplied via conductor 66 to a phase shifter or integrator 68. A conductor 70 couples the output of the phase shifter 68 through an automatic gain control device 72 and over a conductor 74 to a second power amplifier 76. A second primary 78 of the Scott connected T transformer 64 is energized by the output of the second power amplifier 76 and, in accordance with well known procedures, in this form of the invention we provide for a three-phase output taken from the points 80, 82 and 84 and supplied via the conductors 16 to the differential selsyns 18 and then to position indicating selsyns 20. In order that the automatic gain control device 72 may maintain a predetermined amplitude relationship between the sinusoidal signals supplied to the power amplifiers 60 and 76, a portion of the output of each of these amplifiers is derived over conductors 86 and 88 to the automatic gain control device and develop a gain control signal in a manner to be described in greater detail hereinafter. Also, in accordance with our invention, we provide a conductor 90 which feeds back a sine wave 90° out of phase with the triangular or integrated square wave from the secondary of the Scott-connected transformer 64 to the wave shaper 52. Due to non-linear characteristics of the integrator 48, there is a distortion in its output. This distortion has been found to be that illustrated in Figure 9. When a sine wave 90° out of phase with the triangular wave is added, it may be seen from an inspection of Figure 9 that the distortion is substantially eliminated and a true triangular wave shape achieved.

A preamplifier which is suitable for use in our invention is illustrated in Fig. 3 and is supplied via the conductor 92 from the pick-up head 4. This is constituted generally by three stages of amplification which take the form of the electron tube amplifiers 94, 96 and 98. For impedance matching purposes, we provide an electron tube 100 connected as a cathode follower to provide an output via the conductor 102.

Figure 4:
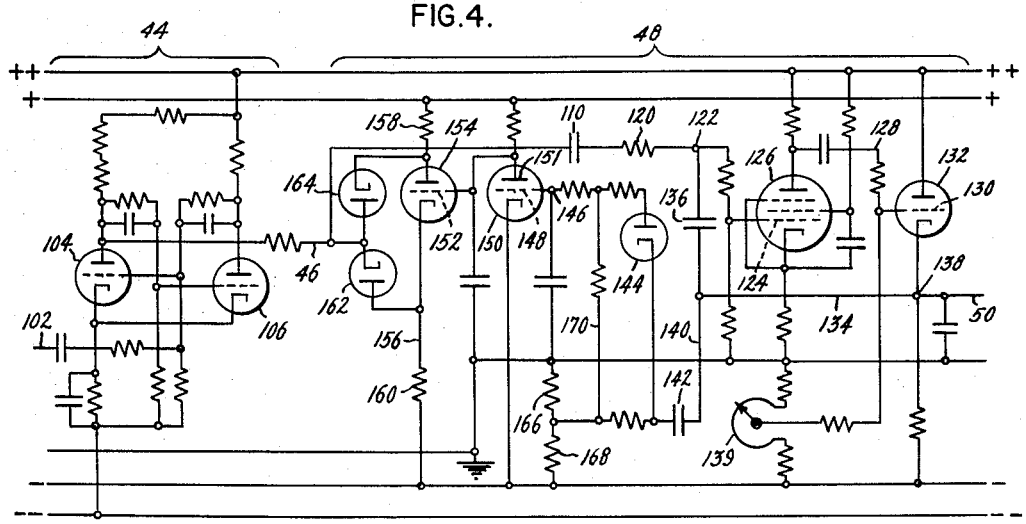
Fig. 4 is a schematic diagram of a square-wave generator and integrating means usable in our invention.

The output of the cathode follower 100 is coupled to control grid of tube 104. As may be seen in Fig. 4, tubes 104 and 106 are connected as a bistable multivibrator or flip-flop device which alternately flips one way on a positive pulse and the other way on a negative pulse. Thus, the output at the plate 108 of tube 104 is a square wave which is coupled via the conductor 46 through the capacitor 110 and resistor 120 to the point 122. The signal at this point is then applied to a control grid 124 of a high gain pentode amplifier 126. After amplification in amplifier 126, signal is coupled by the conductor 128 to a control grid 130 of a vacuum tube amplifier 132 which is connected as a cathode follower. The output of the cathode follower 132 is fed back through a conductor 134 and capacitor 136 to the point 122. Due to the high gain of tube 126, the voltage at point 122 cannot be very large. The negative voltage feedback provided from the cathode of cathode follower 132 via conductor 134 and capacitor 136 keeps the voltage at point 122 at a low value. Thus, the current being fed back through 134 and 136 is equal to the current through resistor 120. The net result of this is to cause the output of cathode follower 132 at the point 138 to be a triangular wave of such an amplitude that the rate of change in voltage causes a current through capacitor 136 which is equal to the square-wave current through resistor 120. Thus, the output of the cathode follower at point 138 is a triangular wave. A potentiometer 139 is to balance the output of the cathode follower 138 around zero in order to minimize the second harmonic of its output.

In order that an accurate sine wave may be formed, it is necessary to control the amplitude of the triangular wave. That is, to hold it to a predetermined value. For this purpose, a portion of the output of the cathode follower 132 is coupled via the conductor 134, 140 and capacitor 142 to the rectifying device such as the diode 144. The tube 144 develops a D.C. voltage which is coupled to the point 146 and from thence to a control grid 148 of a vacuum tube amplifier 150. The plate 151 of the vacuum tube amplifier 150 is coupled to the control grid 152 of the electron tube 154. The electron tube 154 is disposed in a conducting path 156 between two points of opposite potential as may be seen in the drawing. Also provided in this path are resistors 158 and 160, one on each side of the tube 154. A pair of oppositely poled diodes 162 and 164 are connected so that one electrode of each diode is disposed on an opposite side of the vacuum tube 154 in the path 156. The other electrode of each diode 162 and 164 is connected to the conductor 46. A voltage divider constituted by the resistors 166 and 168 normally provides a negative bias to point 146 over the conductor 170. When the D.C. voltage output of the rectifier 144 exceeds this bias in the negative direction, the grid 148 becomes negative and its plate therefore positive causing the tube 145 to conduct more heavily. The points at which the diodes 162 and 164 are coupled to the conductor 156 now move closer together because there is a larger voltage drop across the resistors 158 and 160. Thus, the cathode of diode 164 becomes less positive and the anode of diode 162 becomes less negative. In this manner, the square wave over conductor 46 is clipped or held to predetermined values of positive and negative polarity by means of the diodes 162 and 164. Therefore, if there should be some change in the circuit and the height or frequency of the input square wave and, consequently, the height of the triangular wave increases or decreases, the change in amplitude in a negative sense at the point 146 will operate in the manner just described to correct the incoming square wave as determined by the voltage derived from the voltage divider consisting of resistors 166 and 168.

Figure 5:
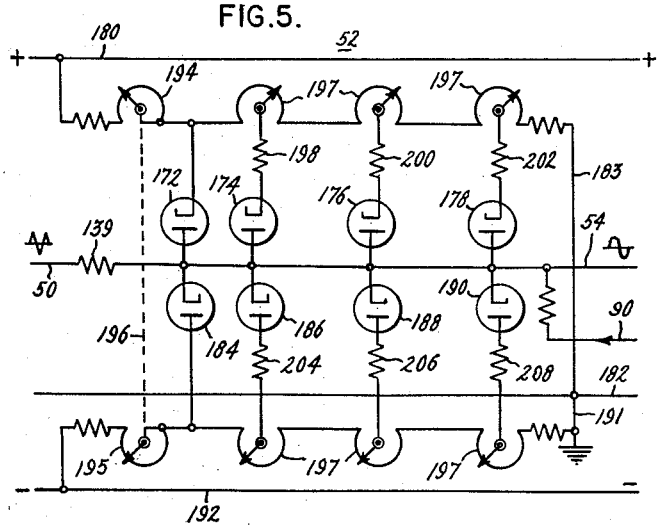
Fig. 5 is a schematic diagram of a wave-shaping means usable in our invention.

The triangular output of the cathode of tube 132 is now fed through to a diode network consisting of a first set of diodes 172, 174, 176 and 178 (Fig. 5) which have their cathodes connected to a bus 180 providing the source of positive potential and to a ground bus 182 by means of the conductor 183. A second group of diodes 184, 186, 188 and 190 have their anodes connected to a conductor 191 coupling a bias from a source of negative potential 192 and the ground bus 182. First potentiometers 194 and 195 are provided in the paths 183 and 191 between the sources of potential and ground. These potentiometers have their wipers mechanically coupled together as indicated by the reference numeral 196. Other potentiometers 197 provide the means for connecting resistors 198, 200 and 202 from the cathodes of diodes 174, 176 and 178 to the conductor 183 and resistors 204, 206 and 208 from the anodes of diodes 186, 188 and 190 to the conductor 191. The electrode of each group of diodes which is not connected to the bus means is coupled to the conductor 50 which receives the input triangular wave from the cathode follower 132. The potentiometers 194, 195 and 197 together with resistors 198 to 202 associated with the diodes 174 to 178 and resistors 204 to 208 associated with the diodes 182 to 186 provide a voltage dividing network. Thus, the setting of each potentiometer slider and the resistance provide a different bias on the electrode of each diode coupled to the potential connecting buses. When the positive going portion of the triangular pulse arrives on conductor 50, the voltage on this conductor will increase until it exceeds the voltage on the cathode of diode 178. At this point, diode 178 will conduct and the rate of increase of the voltage will decrease. The voltage then will increase at this new rate until the voltage on the cathode of diode 176 is exceeded, at which point this diode will conduct and the voltage will increase at a still further reduced rate. After the positive peak is reached, the voltage begins to decrease at rates corresponding to increasing rates until zero is reached. Upon the arrival of the negative going portion of the triangular pulse, the diodes 184 to 190 will function in the same manner. By this means, a substantially sinusoidal wave will be derived over output conductor 54 of the wave shaper 52 when the potentiometers are appropriately adjusted.

In order to insure that the output of the wave-shaping device 52 has a substantially sinusoidal configuration and a very low harmonic content, a portion of the output of one of the power amplifiers is derived via the conductor 90 and coupled to the diode wave shaper. The output of the cathode follower has a slight deviation from a true triangular wave form and that the effect of this deviation can be greatly reduced by the addition of a sine wave which is 90° out of phase with triangular wave shape. The potentiometers 194 and 195 establish an operating level for the entire voltage dividing network such that the peak of the sinusoidal wave formed by network and the diodes is approximately 65% of the peak of the triangular wave coupled thereto. Such a relationship between the two waves minimizes the harmonic content of the sinusoidal wave and thereby helps to insure a substantially pure fundamental output. The potentiometers 197 establish the clipping levels of the diodes with which they are associated and by so doing minimize any higher order harmonics.

Figure 6:
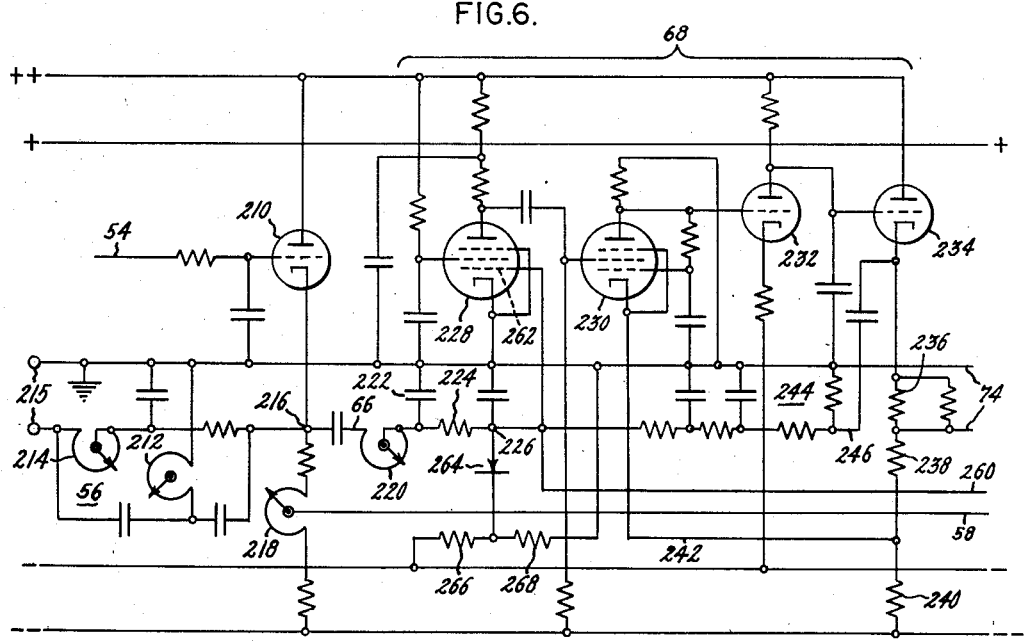
Fig. 6 is a schematic diagram of a phase shifter and amplifying means usable in our invention.

Referring to Fig. 6, the output of the wave shaper 52 is coupled via the conductor 54 to a cathode follower 210. The output of the cathode follower is fed to a filter network 56 consisting of a twin T filter including potentiometers 212 and 214. The action of this filter is to remove the fundamental frequency and to allow the display of harmonics. The potentiometers 212 and 214 are provided in order to balance the filter to an exactly zero output at the fundamental frequency. Thus, a display device 57 may be coupled to the output jacks 215 and the harmonics present in the sine wave examined. Depending on the number and the amplitude of the harmonics seen, the potentiometers 139, 194, 195 and 197 may be adjusted to reduce their values to zero or to otherwise minimize them. The sine wave at the point 216 is in phase with the control signals or pulses from the tape. A portion of this signal is taken from the potentiometer 218 and fed via the conductor 58 to the first power amplifier 60, to construct an additional sine wave which is 90° out of phase with the sine wave at point 216. This is done by feeding the sine wave through the potentiometer 220 and the phase-shifting network constituted by the resistors 222 and 224 to the point 226. The signal at this point is amplified by the multi-grid electron tube amplifier 228. Additional amplification is provided by the electron tube amplifiers 230 and 232. A cathode follower 234 couples the signal to a voltage divider consisting of the resistors 236 and 238 and the output is derived for the second power amplifier 76 via the conductor 74. A common cathode resistor 240 is provided for the tubes 230, 232 and 234 and the conductor 242 provides negative feedback from the cathode follower 234 and common cathode resistor 240 in order to prevent any harmonic distortion. A filter network 244 is provided with a feedback loop 246 from the cathode follower 234 to the multi-grid amplifier 228 in order to stabilize the system and to reduce noise due to flutter in the tape transport feeding signals into the system.

Figure 7:
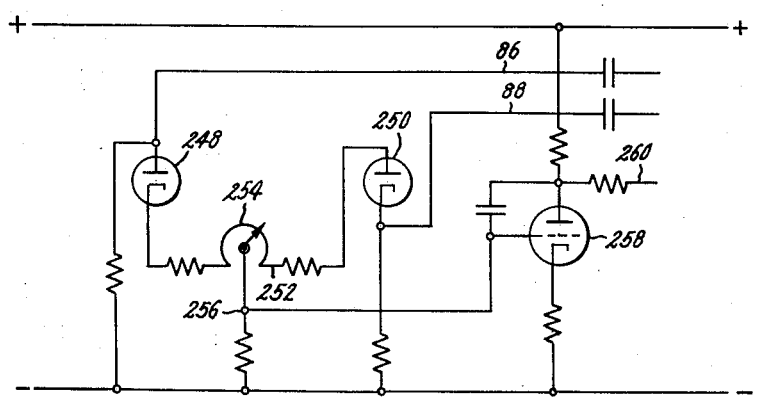
Fig. 7 is a schematic diagram of an automatic gain control device usable in our invention.

Referring to Fig. 7, we show a means for developing an automatic gain control so that the relative amplitudes of the sinuosidal signals fed to the power amplifiers 60 and 76 may be held to predetermined heights. Sine waves from each of the power amplifiers having a 90° phase displacement are coupled via the conductors 86 and 88 to a pair of rectifying devices such as diodes 248 and 250. Signals via the conductor 86 are coupled to the anode of the diode 248 while the signals via the conductor 88 are coupled to the cathode of diode 250. As may be seen in the drawing, the cathode of diode 248 is connected to one end of a potentiometer 252 while the anode of diode 250 is connected to the other end. These diodes rectify the sinusoidal output of the power amplifiers and provide a D.C. signal across the potentiometer 252. The D.C. voltages are of opposite polarity on each end of the potentiometer and the magnitude of each of these D.C. voltages is determined by the amplitude of the sinusoidal signal applied to it. The slider 254 of the potentiometer is set so that at the point 256 a predetermined relationship between the two amplitudes will be established and if the relative voltages are correct, the voltage at point 256 will be some predetermined value. The voltage, however, will differ from this value when the relative gain of the amplifier incorporated in the phase shifter 68 is not correct and an error signal of a polarity and magnitude indicative of the unbalanced condition will be amplified by the electron tube amplifier 258 and coupled via the conductor 260 to the control grid 262 of the amplifying tube 228 to thereby vary the gain of the tube. The rectifier and the resistors 266 and 268 in a voltage dividing network act to set a minimum negative value to which the grid of tube 228 can be swung.

Figure 8:
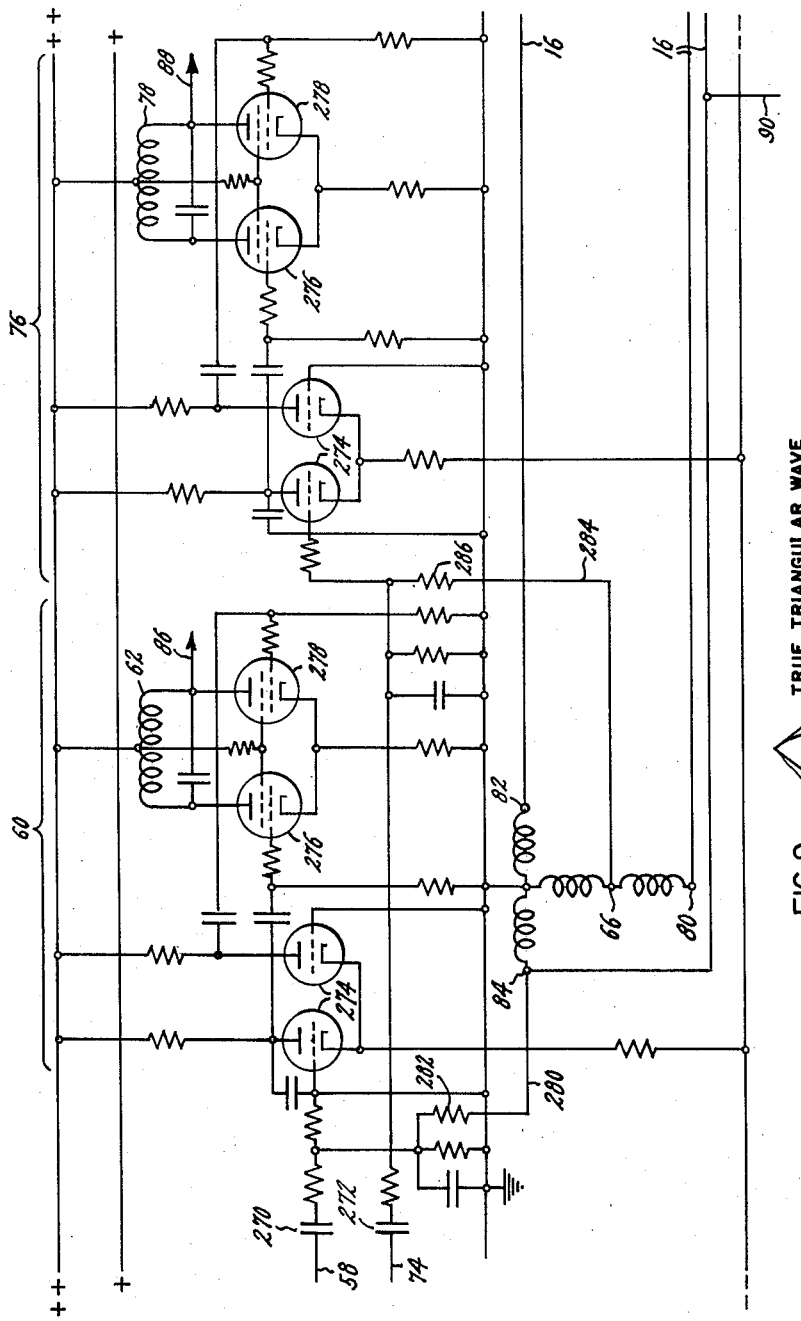
Fig. 8 is a schematic diagram of amplifying devices usable in conjunction with our invention.

In Fig. 8 of the drawing, we show power amplifiers which may be used in conjunction with our invention. Each of these power amplifiers is similar and only one will be described in detail. The output of the wave shaper 56 is coupled via the conductor 58 and a capacitor 270 and the output of phase shifter 68 is coupled via the conductor 74 and capacitor 272 to the control grid of a pair of electron tubes 274 having a common cathode connection to function as a long-tail pair. The output of the tubes 274 drives a pair of amplifying tubes 276 and 278 so as to provide a push-pull output to the primary 62 of a Scott-connected T transformer. The secondary 66 of this transformer has a negative feedback provided through a conductor 280 and a resistor 282 so as to maintain the voltage in the secondary substantially equal to the input voltage of the power amplifier thereby providing a high power gain. Negative voltage feedback for the power amplifier 76 is provided by a conductor 284 and resistor 286 in order that the desired power amplification may be achieved.

It may be seen, therefore, that we provide in this invention a means for deriving at least a two-phase signal from a reference signal stored in a data storage medium, and means are provided for eliminating harmonics and for achieving an accurate sine wave output from a normal pulse input.

Although in accordance with the provisions of the patent statutes this invention is described as embodied in concrete form, and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit and scope of this invention or from the scope of the annexed claims.

What we claim as new and desire to secure by Letters Patent of the United States is:

1. In a program control system wherein a reference pattern is stored in a data storage medium the improvement comprising, means for deriving a reference signal from said data storage medium, means for developing a square-wave alternating signal from said reference signal, means for integrating said square-wave alternating signal, wave-shaping means comprising a source of positive potential and a source of negative potential, a conductor connecting said positive and negative sources to ground, a first plurality of rectifying devices having their cathodes coupled to said conductor between said positive source and ground, a second plurality of rectifying devices having their anodes coupled to said conductor between said negative source and ground, potentiometer means interposed in said conductor, and means connecting a potentiometer adjacent said positive source with a potentiometer adjacent said negative source whereby an over-all operating voltage level may be established for said rectifying devices; means coupling the output of said integrating means to the anodes of said first plurality of rectifying devices and to the cathodes of said second plurality of said rectifying devices, a first amplifying device, means coupling the output of said wave-shaping means to said first amplifying device, phase-shifting means coupled to the output of said wave-shaping means, a second amplifying device coupled to the output of said phase-shifting means, means responsive to the relative amplitudes of the outputs of said amplifying devices to maintain the output of said phase-shifting means at a predetermined value of amplitude relative to the output of said first amplifying device, means for deriving an output of at least two phases from said amplifying devices and means for feeding back to said wave-shaping means a portion of the output of one of said amplifying devices.

2. In a program control system as described in claim 1 wherein the improvement also comprises a filter passing only harmonics of the output of said wave-shaping means coupled to said wave-shaping means.

3. In a program control system wherein a reference pattern is stored in a data storage medium the improvement comprising means for deriving a reference signal from said data storage medium, means for developing a square-wave alternating signal from said reference signal, means for integrating said square-wave alternating signal, means for forming said integrated square-wave alternating signal into a substantially sinusoidal alternating signal, means for amplifying a portion of said substantially sinusoidal alternating signal, means for shifting the phase of another portion of said substantially sinusoidal alternating signal, means for amplifying the phase shifted portion of said substantially sinusoidal alternating signal, and feedback means coupling a sinusoidal alternating signal 90° out of phase with said integrated square-wave signal from one of said amplifying means to said wave-forming means.

4. In a program control system wherein a reference pattern is stored in a data storage medium the improvement comprising means for deriving a reference signal from said data storage medium, means for developing a square-wave alternating signal from said reference signal, means for integrating said square-wave alternating signal, wave-shaping means for forming said integrated square-wave alternating signal into a substantially sinusoidal alternating signal, said wave-shaping means including a first plurality of rectifying devices, a first conductor connecting the cathodes of said first plurality of rectifying devices between a source of positive potential and ground, a first potentiometer connected in said first conductor between said first plurality of rectifying devices and the source of positive potential, a second plurality of rectifying devices, a second conductor connecting the anodes of said second plurality of rectifying devices between a source of negative potential and ground, a second potentiometer connected in said second conductor between said second plurality of rectifying devices and the source of negative potential, and means mechanically connecting the adjusting elements of said first and second potentiometers whereby they may be adjusted together to establish an over-all operating level for said wave-shaping means, means for amplifying a portion of the output of said wave-shaping means, means for shifting the phase of another portion of the output of said wave-shaping means, means for amplifying the phase shifted portion and feedback means coupling a sinusoidal alternating signal 90° out of phase with said integrated square-wave signal from one of said amplifying means to said wave-forming means.

References Cited in the file of this patent

UNITED STATES PATENTS

| | | |
|---|---|---|
| 2,333,502 | Wickham | Nov. 2, 1943 |
| 2,551,348 | Sunstein | May 1, 1951 |
| 2,624,796 | Saunders | Jan. 6, 1953 |
| 2,686,282 | Salamonovich | Aug. 10, 1954 |
| 2,748,278 | Smith | May 29, 1956 |